Jan. 27, 1959  W. F. R. SCADDEN  2,870,573
CHEMICAL SUPPLY MEANS FOR PRUNING SHEARS
Filed Aug. 28, 1957
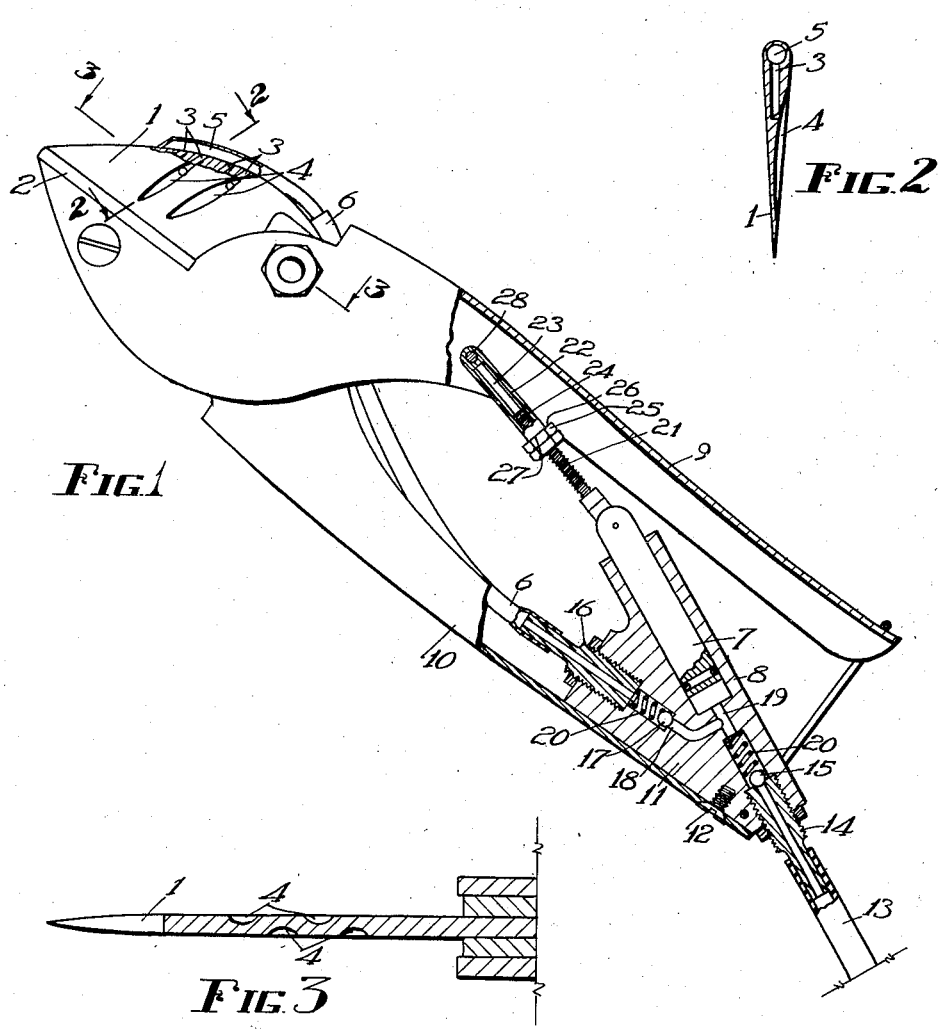

United States Patent Office 2,870,573
Patented Jan. 27, 1959

2,870,573

CHEMICAL SUPPLY MEANS FOR PRUNING SHEARS

William Frederick Reuben Scadden, Berri, South Australia, Australia

Application August 28, 1957, Serial No. 680,805

3 Claims. (Cl. 47—1)

This invention relates to chemical supply means for pruning shears and in particular it relates to means which will supply a treatment chemical to the limbs which have been pruned.

It is known to treat the limbs of trees which have been pruned by a chemical substance such as, for instance, zinc oxide for vines and citrus fruits and zinc sulphate for apricots and similar fruits, and the customary method at present is to first prune the trees and to then treat each of the cut stems by applying the chemical either with a brush or with a stick having a piece of hessian on its end dipped into the treatment chemical.

This method as known at present wastes a considerable amount of time because it is necessary to carry out two operations and also it is possible to miss some of the cuts which have been made and thus leave the vine or tree subject to attack by bacteria or growths.

Developmental work has shown that improved shears may be constructed by means of which a protective, curative, stimulative or other liquid may be pumped to a blade by which a cut is effected.

My invention relates to such an apparatus, an object being to so arrange the mechanism that the cutting blade is left relatively free of obstruction, a further object being to ensure that the liquid will be applied in measured quantity over a required area of the blade.

According to my invention the pruning shears have handles and co-operating cutting means including a cutting blade, channels being formed in the said cutting blade itself to distribute the liquid over the blade, pump means being arranged to supply liquid to the channels when the handles are actuated.

To enable this invention to be fully understood, an embodiment thereof will now be described with reference to the accompanying drawings in which:

Fig. 1 is a sectional elevation of such pruning shears,

Fig. 2 is a section of the blade on lines 2—2 of Fig. 1, and

Fig. 3 is a section of the blade on line 3—3 of Fig. 1.

The shears comprise a blade 1 and an anvil 2, the blade being provided with channels 3 which break out into grooves 4 so arranged that as the blade 1 cuts into the wood, an amount of the treatment liquid will be discharged into the channels and grooves and will thus be deposited on the surface being cut. A duct 5 places all channels 3 into communication with a flexible tube 6 which feeds the liquid to the blade 1. The grooves are staggered on the two sides so that the strength of the blade is not reduced unduly.

The unit is provided with control means whereby the required quantity of the treatment liquid will be discharged to the blade during each cutting stroke thereof, such means comprising a pump having a plunger 7 disposed in a cylinder 8 to be operated by the handles 9 and 10 to displace a given quantity of the material from the container each time the handles are manipulated to cause the blades to effect a cut.

The cylinder 8 is an integral part of a block 11 which is secured to the handle 10 by a screw 12, and an inlet tube 13 from a suitable container (not shown), which may be carried on the back or elsewhere by the operator, engages a nipple 14 which extends from block 11 and has a one way inlet valve 15 associated therewith. The block 11 also has a nipple 16 extending therefrom which couples to the tube 6.

In the block, and held in place by the nipple 16, is an outlet valve 17 in a duct 18, and the two valves 15 and 17 are in communication with the rear end of cylinder 8 by way of a duct 19 and the ducts 18 and 19, respectively. The valves 15 and 17 are retained on their seats by springs 20.

The piston is coupled to the handle 9 by a threaded rod 21 engaging in a sleeve 22 in which it has limited axial movement by means of a slot 23 and pin 24. Adjustment of rod 21 relative to sleeve 22 is effected by means of an adjusting nut 25 which is screwed on the threaded rod 21, with the face 26 of the nut 25 being arranged to contact the end 27 of the sleeve 22. In this way the extent of movement of the pin 24 in the slot 23 is variable and thus the extent of movement of the piston 7 in the cylinder 8.

The sleeve 22 is connected at its forward end to the handle 9 by a pin 28 carried by that handle.

From the foregoing it will be clear that a simple unit is provided which will supply a charge of treatment liquid to the blade 1, each time a cut is made, the quantity being variable by adjusting the nut 25 to control the extent of movement of the rod 21 in relation to the sleeve 22. Because of the use of the two valves 15 and 17, a pumping action results which will draw liquid from the tank carried by the operator.

It will be realised that the invention can be substantially varied in its constructional features, and as previously mentioned, it may be applied to various types of pruning shears or secateurs whether these are of the two blade type or of the blade and anvil type.

What I claim is:

1. Improved pruning shears having handles and co-operating cutting means comprising a cutting blade connected to one handle and an anvil connected to the other handle, channels formed within said cutting blade itself which break out into grooves in the face of the said blade, pump means mounted on said one handle, adjustable link means between said pump means and said other handle to vary the stroke of said pump, a tube connecting said pump means with the said channels through the back of the said blade, and a tube to connect said pump means with a supply container.

2. Improved pruning shears having handles and co-operating cutting means including a cutting blade, channels formed within said cutting blade itself which break out into grooves in the face of said blade, a duct within said blade communicating with said channels, a flexible tube connected with said duct through the back of said blade, pump means mounted on one of said handles and connected to said tube, link means between said pump means and the other of said handles to actuate the said pump means to draw liquid from a container and force it into said flexible tube and thus to the duct and into the said channels and out of the grooves in the face of the said blade when said one handle is moved in relation to the other.

3. Improved pruning shears having handles and cooperating cutting means comprising a cutting blade connected to one handle and an anvil connected to the other handle, channels formed within said cutting blade itself which break out into grooves in the face of said blade, pump means connected to said one handle which carries the cutting blade, a link connection between said pump means and said other handle to operate the pump means when said one handle is moved in relation to said other handle, a flexible tube from the inlet of said pump means to a container for liquid, and a tube from the outlet of said pump to said channels, the last mentioned tube connecting with said channels through a duct which enters through the back of said blade.

References Cited in the file of this patent

UNITED STATES PATENTS

| | | |
|---|---|---|
| 2,462,701 | Wirth | Feb. 22, 1949 |
| 2,726,484 | Simpkins | Dec. 13, 1955 |
| 2,730,838 | Wilson | Jan. 17, 1956 |